United States Patent
Hill et al.

(10) Patent No.: US 11,373,154 B1
(45) Date of Patent: Jun. 28, 2022

(54) SYSTEMS AND METHODS FOR COMPLETING TRANSACTIONS VIA CURBSIDE SERVICE

(71) Applicant: Wells Fargo Bank, N.A., San Francisco, CA (US)

(72) Inventors: Miranda C. Hill, Seattle, WA (US); Alicia Y. Moore, San Ramon, CA (US); Susan Symons, Mooresville, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 99 days.

(21) Appl. No.: 17/000,677

(22) Filed: Aug. 24, 2020

Related U.S. Application Data

(63) Continuation of application No. 16/199,052, filed on Nov. 23, 2018, now Pat. No. 10,755,249, which is a continuation of application No. 15/477,309, filed on Apr. 3, 2017, now Pat. No. 10,846,668.

(60) Provisional application No. 62/321,576, filed on Apr. 12, 2016.

(51) Int. Cl.
| | |
|---|---|
| *G06Q 20/10* | (2012.01) |
| *G06Q 20/32* | (2012.01) |
| *G06Q 20/40* | (2012.01) |
| *G06Q 20/38* | (2012.01) |

(52) U.S. Cl.
CPC ....... *G06Q 20/108* (2013.01); *G06Q 20/3278* (2013.01); *G06Q 20/381* (2013.01); *G06Q 20/405* (2013.01)

(58) Field of Classification Search
CPC ........ G06Q 20/10; G06Q 20/38; G06Q 20/40; G06Q 20/32
See application file for complete search history.

(56) References Cited

U.S. PATENT DOCUMENTS

| | | |
|---|---|---|
| 7,797,342 B2 | 9/2010 | Banks et al. |
| 7,885,413 B2 | 2/2011 | Vasic et al. |
| 8,322,601 B1 | 12/2012 | Benore et al. |
| 8,340,299 B2 | 12/2012 | Buer et al. |
| 8,638,934 B2 | 1/2014 | Deaver et al. |
| 8,750,516 B2 | 6/2014 | Goodman et al. |

(Continued)

OTHER PUBLICATIONS

"Chick-fil-A Launches Mobile Payment Nationwide, Pilots Mobile Ordering," Dec. 8, 2014. http://www.multivu.com/players/English/7126353-chick-fil-a-launching-new-mobile-app-payment-order-system/ (Year: 2014). 3 pages.

(Continued)

*Primary Examiner* — Scott S Trotter

(74) *Attorney, Agent, or Firm* — Foley & Lardner LLP

(57) ABSTRACT

A method performed by a processor of a financial institution computing system includes receiving a curbside transaction description from a user device, transmitting a curbside set-up request to a branch location computing system associated with the branch location, transmitting curbside transaction information to the user device, receiving location information from the user device indicative of the user device being located at the branch location, receiving an authentication identifier from the user device, wherein receiving the authentication identifier initiates the curbside transaction, and servicing the account holder via a receptacle of a plurality of receptacles, the receptacle chosen based on the location information and the curbside transaction description.

20 Claims, 7 Drawing Sheets

(56) References Cited

U.S. PATENT DOCUMENTS

| | | |
|---|---|---|
| 8,813,247 B1 | 8/2014 | Alten |
| 8,966,281 B1 | 2/2015 | Raizen et al. |
| 9,137,658 B2 | 9/2015 | Kawamura et al. |
| 9,158,933 B2 | 10/2015 | Banks et al. |
| 9,288,044 B2 | 3/2016 | Spalka et al. |
| 9,432,346 B2 | 8/2016 | Madden |
| 2007/0187183 A1 | 8/2007 | Saigh et al. |
| 2014/0074743 A1 | 3/2014 | Rademaker |
| 2014/0211016 A1 | 7/2014 | Nerayoff et al. |
| 2014/0379529 A1 | 12/2014 | Agasti et al. |
| 2015/0026456 A1 | 1/2015 | Kim et al. |
| 2015/0304315 A1 | 10/2015 | Estehghari et al. |
| 2016/0125412 A1 | 5/2016 | Cannon |
| 2016/0247113 A1 | 8/2016 | Rademaker |
| 2017/0192635 A1 | 7/2017 | Jones-McFadden et al. |
| 2017/0262824 A1 | 9/2017 | Singh |
| 2017/0287021 A1 | 10/2017 | Gilbertson et al. |

OTHER PUBLICATIONS

"Fed up witn fast food, Americans turn to 'curbside takeout,'" New York Times, Jun. 5, 2006. https://www.nytimes.com/2006/06/05/business/worldbusiness/05iht-food.1893743.html (Year: 2006). 5 pages.

"From App to Architecture: How Curbside Designed and Built Its 'Pickup Pod,'" FastCompany.com, Aug. 24, 2015. https://www.fastcompany.com/3049675/from-app-to-architecture-how-curbside-designed-and-built-its-pickup-pod (Year: 2015). 13 pages.

Darwish et al., "Database Encryption Using Fuzzy Chaotic", International Journal of Future Computer and Communication, vol. 3, No. 6, Dec. 2014. 8 pages.

Khaing et al., "Secured Key Distribution Scheme for Cryptographic Key Management System", IEEE Computer Society, 2010 International Conference on Availability, Reliability and Security, 2010. 6 pages.

Politics & Government Week; Patents; Patent Application Titled "Remote Monitoring and Management of an Instant Issuance System"; Atlanta (Year: 2017).

SYSTEMS AND METHODS FOR COMPLETING TRANSACTIONS VIA CURBSIDE SERVICE

CROSS-REFERENCE TO RELATED APPLICATIONS

This application is a continuation of U.S. Non-Provisional application Ser. No. 16/199,052 entitled "SYSTEMS AND METHODS FOR COMPLETING TRANSACTIONS VIA CURBSIDE SERVICE," filed Nov. 23, 2018, which is a continuation of U.S. Non-Provisional application Ser. No. 15/477,309 entitled "SYSTEMS AND METHODS FOR COMPLETING TRANSACTIONS VIA CURBSIDE SERVICE", filed Apr. 3, 2017, which claims the benefit of U.S. Provisional Patent Application No. 62/321,576 entitled "SYSTEMS AND METHODS FOR COMPLETING TRANSACTIONS VIA CURBSIDE SERVICE", filed Apr. 12, 2016, all of which are incorporated herein by reference in their entirety.

BACKGROUND

Financial institutions provide a plethora of financial services to customers to assist in the completion of transactions and to meet the needs of the customers. One service includes assisting with transactions that involve "in-hand" funds, for example, the withdrawal or deposit of cash. Currently, a customer may engage in the withdrawal and deposit of these funds by walking into a branch location of a financial institution and initiating the withdrawal or deposit request via interaction with a teller at the branch. At some branch locations, the customer can stay in a vehicle and enter an attached drive-through to initiate the withdrawal or deposit request via interaction with a teller at the branch over a telecom. However, the customer is only able to access the financial institution during operating hours, which are usually between the hours of 9 AM to 5 PM. Many customers may find these hours inconvenient and in conflict with their work schedules, requiring them to leave a job during the work day to complete the desired transaction. While a financial institution may have automated teller machines (ATMs) in various locations outside of a branch location to allow the customer, at any hour of the day, to withdraw cash after authenticating at the ATM, the type of transactions may be limited to just withdraws and deposits. Despite the ability to engage in these "in-hand" fund transactions inside branch locations and at ATMs, there is a need for more flexible systems and methods to engage in these transactions, more convenience, and a more time effective method to complete these transactions.

SUMMARY

Various embodiments relate to a method performed by a financial institution computing system. One example method includes receiving a curbside transaction request to execute a transaction from a user device of an account holder of the financial institution. The curbside transaction request includes at least one of a transaction description and a transaction time. The financial institution determines a branch location from a plurality of branch locations associated with the financial institution for which to carry out the transaction. The financial institution transmits a curbside set-up request to the branch location. The financial institution also transmits the curbside transaction information to the user device. The curbside transaction information sent to the user device includes the branch location and authentication details.

Various other embodiments relate to a method performed by a financial institution's branch computing system that is associated with a financial institution. One example method includes receiving, from a financial institution computing system, a curbside set-up request. The a curbside set-up request includes at least one of a transaction description and a transaction time. The branch computing system generates an employee instruction based on the curbside set-up request. The branch receives an arrival notification, the arrival notification is responsive to an account holder arriving at the branch location to begin the curbside transaction. Upon completion of the transaction, the branch generates a transaction completion message based on a transaction of funds at the branch location.

Various other embodiments relate to a financial institution computing system associated with a financial institution. One example system includes a network interface configured to communicate data to and from a branch computing system associated with a branch of the financial institution and a user device associated with a user over a network. The system also includes a branch database that contains information relating to the curbside service availability of the financial institution branches associated with the financial institution. The financial institution has a circuit structured to execute a series of commands. The series of commands include receiving a curbside transaction request from a user device that is associated with an account holder of the financial institution. The curbside transaction request includes at least one of a transaction description and a transaction time. The series of commands include determining a branch location from a plurality of branch locations associated with the financial institution. The determination is based, in part, on the transaction description and transaction time. The series of commands include transmitting a curbside set-up request to the branch computing system and transmitting the curbside transaction information to the user device.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Figure 1:
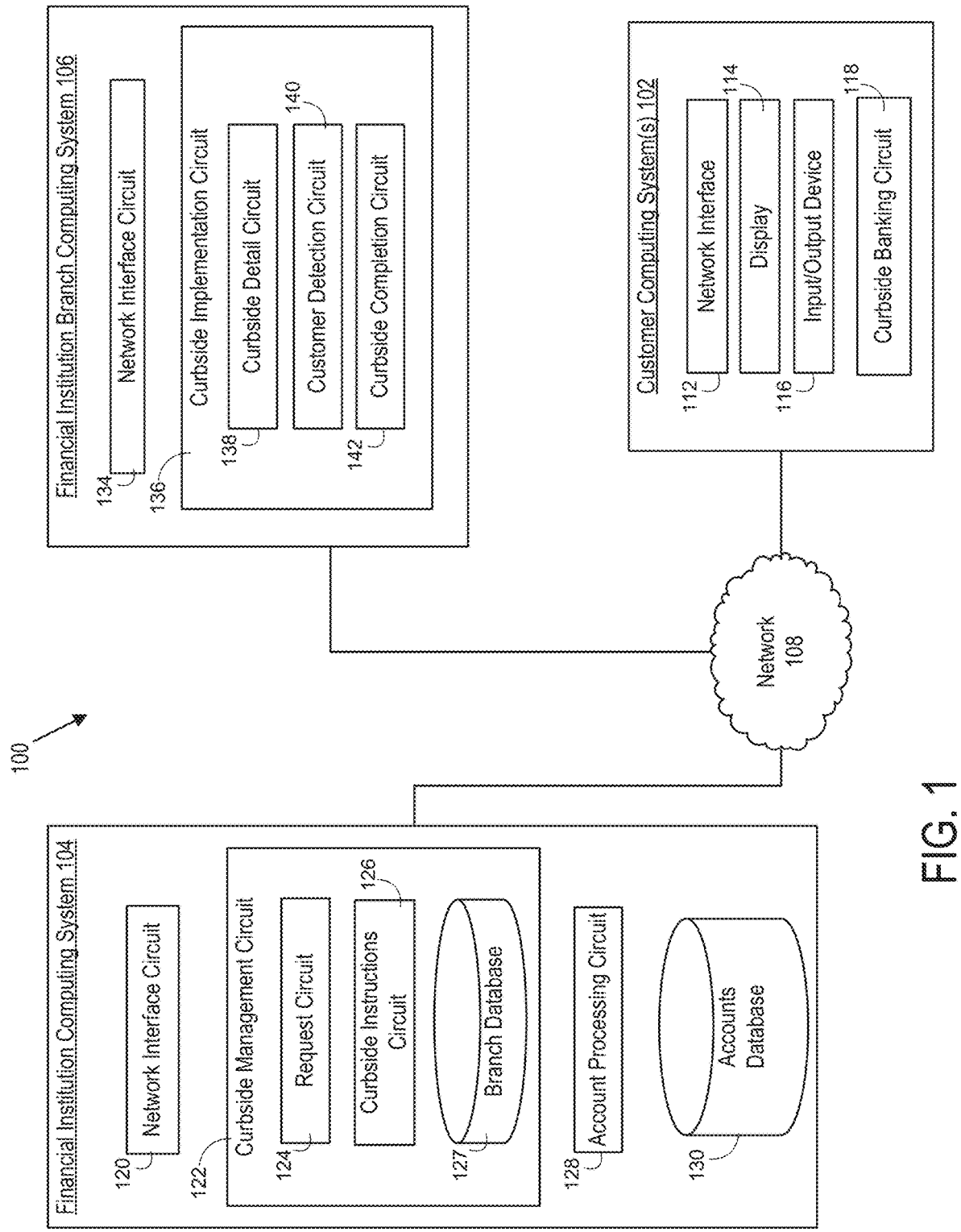
FIG. 1 is a schematic diagram of a curbside transaction processing system, according to an example embodiment.

Referring generally to the figures, systems and methods for completing banking transactions (e.g., withdrawing, depositing and exchanging currency) via a curbside service are described. The embodiments described herein alleviate the time uncertainty and inconvenience associated with conducting transactions involving the physical passing of items (e.g., coins and bills) that are limited to a financial institution. For example, various embodiments reduce the uncertainty of wait time and organize the transaction before the account holder arrives at the financial institution's branch to complete the transaction. The described systems and methods enable account holders to easily engage in withdrawals, deposits, currency exchanges, and the like, in accordance with the account holder's terms, time and schedule, all without the account holder having to leave the comfort of the vehicle.

As described in further detail below, the account holder interacts with the financial institution, at the leisure of the account holder, to submit a request to complete a transaction curbside at one of the financial institution's branch locations. The embodiments account holder selects from a variety of options including a transaction type, a transaction amount, a transaction location, and a transaction time. The options allow the account holder to structure a transaction that fits the account holder's needs and time constraints. For example, the account holder can interact with the financial institution via a financial institution application or website in real-time to receive open curbside transaction times and locations for all of the financial institution branches that offer the curbside service. On the backend, the financial institution works with the available branches to provide the account holder with the available time slots and locations to complete the account holder's requested transactions. Once a request is submitted, the financial institution's branch organizes the transaction items to complete the transaction when the account holder arrives. The account holder can submit the request on any web-enabled device, for example a desktop, laptop, cellphone, or other mobile computing devices. The transaction request may relate to any combination of a deposit of funds, a withdrawal of funds, an exchange of a first type of funds for a second type of funds (e.g., a foreign exchange transaction, an exchange of bills for coins, an exchange of coins for bills, etc.), or the like. Once the request is submitted, the financial institution identifies a suitable branch location for the transaction, informs the account holder of the branch location and the transaction window time, and configures the financial institution's branch for completion of the transaction (e.g., by preparing physical funds for delivery to the customer on arrival). Accordingly, the account holder will have certainty that, when arriving at the branch location at the designated date and time, the transaction can be completed.

FIG. 1 is a schematic diagram of a curbside transaction system 100, according to an example embodiment. The curbside transaction system 100 includes one or more customer computing system(s) 102, a financial institution computing system 104 associated with a financial institution (e.g., a bank), and a financial institution branch computing system 106 associated with an individual branch of the financial institution. Each of the customer computing system 102, the financial institution computing system 104, and the financial institution branch computing system 106 are in operative communication with each other via a network 108. The network 108 includes, for example, the Internet, cellular networks, proprietary banking networks, and the like. In some arrangements, the financial institution computing system 104 and the financial institution branch computing system 106 are in communication via a secure network or intranet, such as an internal banking network associated with the financial institution.

Generally, customers (e.g., an account holder at the financial institution) use the curbside transaction system 100 to submit a request to the financial institution computing system 104 to engage in a requested curbside transaction. Through a user interface provided by the financial institution (e.g., via a smartphone application, via an online banking website, etc.), the customer can authenticate himself or herself as an account holder with the financial institution, select a desired transaction type (e.g., withdrawal, deposit, exchange, etc.), provide relevant transaction descriptions (e.g., amount of currency, type of currency, desired date and time of transaction, etc.), identify a branch location and a transaction time window for which the customer can complete the transaction in accordance with the customer's schedule (e.g., by selecting an available branch on the user interface, by affirming a financial institution suggested available branch, etc.). The financial institution computing system 104 automatically generates the transaction message and sends it to the computing system 106 of the determined branch of the financial institution. The branch computing system 106 executes commands related to the received transaction message. The commands direct the branch location's employees to complete the customer's request. For example, the employee physically prepares the relevant transaction materials in anticipation of the transaction time.

The customer computing systems 102 include a network interface circuit 112, a display 114, an input/output device 116, and a curbside banking circuit 118. The network interface 112 is structured to facilitate operative communication between the customer computing systems 102 and other systems and devices over the network 108. The customer computing systems 102 may include any of smartphones, tablet computing systems, laptop computing systems, desktop computing systems, PDAs, smart watches, smart glasses, tablets, etc.

The display 114 is structured to present user interfaces to the customers. For example, when customers use the customer computing systems 102 to access a financial institution application or website, the display 114 presents account information, transaction information, and the like, to the customers. The input/output device 116 is structured to receive input from the customer via the customer computing systems 102. In some arrangements, the display 114 and the input output device 116 are combined (e.g., as a touchscreen display). As described in further detail below, the input/output relates to curbside transaction requests, location selection, personal information, vehicle information and other information used to facilitate transactions between the financial institution, the customers, and the financial institution branches that offer curbside service. The input/output device 116 can be used by the customer to provide transaction descriptions (e.g., transaction type, branch location, transaction amount in U.S.D. currency or foreign currency, transaction window, etc.) to be carried out by the financial institution computing system 104 and the financial institution branch computing system 106. The input/output device 116 may include a keyboard, a mouse, a touchscreen, a biometric sensor (e.g., a fingerprint sensor), a microphone, a camera, etc.

The curbside banking circuit 118 is structured to provide the customer with a user interface to arrange for financial transactions with the financial institution via one of the branch locations. For example, via the curbside banking circuit 118, the customer can withdraw funds, deposit funds, exchange funds or complete similar transactions at a branch location. The curbside banking circuit 118 may comprise program logic (e.g., stored executable instructions) structured to cause a processor to implement at least some of the functions described herein. The curbside banking circuit 118 may be formed at least in part by web browser (e.g., Safari®, Chrome®, Internet Explorer®, etc.) configured to receive and display web pages received from the financial institution computing system 104. In other arrangements, the curbside banking circuit 118 is formed, at least in part, by a dedicated application (e.g., a smartphone application), a text message interface, or another program executed locally on the customer computing system 102 suitable for communicating with the financial institution computing system 104 over the network 108. This facilitates the customers' ability to have a branch location be prepped, and an employee or machine at the branch ready to deliver the customer specified transaction to the customer's vehicle. The customer logs into his or her existing financial institution account by providing online banking credentials (e.g., a username and password) via the curbside banking circuit 118 and submit a curbside transaction request, with available curbside locations and pickup window choices being responsive to the customer transaction type and customer location. The curbside banking circuit 118 can also provide the customer with transaction descriptions including curbside location, parking spot, or any authentication information. Example interfaces generated by the curbside banking circuit 118 for display to the customer via the display 114 are shown in FIGS. 4A-D.

In some embodiments, the financial institution computing system 104 provides the programming instructions necessary to implement the curbside banking circuit 118 as part of a software application made available for download and installation on the customer computing systems 102 (e.g., via the online banking website of the bank, via an app store, or in another manner). Responsive to a user selection of an appropriate link, the curbside banking circuit 118 for requesting a curbside transaction through the customer's deposit account, is transmitted to the customer computing system 102 from the financial institution computing system 104 and may cause itself to be installed on the customer computing system 102. Installation of the software application creates the curbside banking circuit 118 on the customer computing system 102.

The financial institution computing system 104 includes a network interface circuit 120, a curbside management circuit 122, an account processing circuit 128, and an account database 130. The financial institution computing system 104 may, for example, include one or more servers each with one or more processors configured to execute instructions stored in a memory, send and receive data stored in the memory, and perform other operations to implement the financial services described herein associated with the processing modules, databases, and processes. In some arrangements, the financial institution computing system 104 also includes the financial institution branch computing system 106.

The network interface 120 is structured to facilitate operative data communication between the financial institution computing system 104 and other systems and devices over the network 108 (e.g., the customer computing systems 102, the financial institution branch computing system 106, etc.) and/or over a secure network or intranet, such as an internal banking network associated with the financial institution.

The curbside management circuit 122 is structured to facilitate the backend processes necessary to conduct curbside transaction via the customer's financial account. For example, the curbside management circuit 122 is structured to receive transaction requests from customer computing systems 102, generate transaction instructions based on received transaction requests, and send the transaction instructions to the financial institution branch computing system 106 associated with a specific branch location, to facilitate the requested transaction at the specified time. The curbside management circuit 122 includes the request circuit 124, the curbside instructions circuit 126 and a branch database 127.

The request circuit 124 is structured to receive and process a customer transaction request to engage in the curbside service. The request circuit 124 has access to the branch database 127. The branch database 127 stores information regarding the financial institution branch locations that offer the curbside service, the curbside transaction types accepted at a given branch location, the curbside service availability (e.g., available days and time slots), the financial institution's branches various currency supplies and other information related to a customer transaction request. For example, the functionality of the request circuit 124 is initiated in response to the financial institution computing system receiving a transaction request or availability inquiry from a customer via the curbside banking circuit 118 on the customer computing system 102. In some arrangements, the request circuit 124 is in real-time communication with customer device such that the interface on the device updates the information fields for the request updates in response to the customer entries. For example, if the customer were to select the exchange currency option and enter the customer's zip code, the request circuit 124 may determine that out of the plurality of financial institution branch locations near the customer's location, only two of the locations could complete the requested transaction (e.g., based on known capabilities and limitations of the financial institution branches, based on real-time on-hand currency quantities of the financial institution branches, etc.). The request circuit 124 could limit the display of the potential financial institution branch locations to those two locations. In other arrangements, the request circuit 124 could receive all the relevant transaction request details (e.g., transaction type, branch location, transaction amount in United States dollars ("U.S.D.") or foreign currency, etc.) and then make the determination of feasibility. For example, the request circuit 124 could receive a transaction request for a withdrawal of 20 U.S.D., between 3:00 PM and 3:10 PM, at the financial institution branch location on ABC Drive. The request circuit 124 could determine that the branch location could handle that transaction and the request circuit 124 could approve that transaction, prompting the curbside instructions circuit 126 to generate the financial institution branch location instructions that are transmitted to the financial institution branch computing system 106. Alternatively, the request circuit 124 could determine that the requested branch location would not be able to comply with the customer request, and the request circuit 124 could deny the request or provide to the requesting customer alternative branch locations or times that could complete the transaction.

Upon approval of a request by the request circuit 124, the curbside instructions circuit 126 is structured to generate and transmit the transaction instructions (e.g., transaction type, passcode information, vehicle information, customer picture, transaction amount in U.S.D. currency or foreign currency, etc.) to the proper financial institution branch computing system 106 associated with the user-identified or selected financial institution branch location. The curbside instructions circuit 126 can also assign a specific parking spot location for the customer to arrive in. For example, the request circuit 124 can compile and provide the finalized request information to the curbside instructions circuit 126 which in turn assigns a parking spot A at the financial institution's branch location for the transaction to occur at. Additionally, the curbside instructions circuit 126 organizes the authentication information for the transaction request. The curbside instructions circuit 126 generates authentication details for the transaction, for example, transmitting customer pickup vehicle information, a photo of the customer, or a passcode to use when arriving at the parking spot. In some arrangements, the curbside instructions circuit 126 is structured to transmit the finalized transaction descriptions, including the curbside number and passcode information, to the customer computing system 102. For example, the curbside instructions circuit 126 transmits that the customer arrive at the branch located on "123 Street" and park in spot A between the hours of 3:00 PM and 3:15 PM, bringing with them one form of identification and a financial institution generated email containing a verbal passcode.

The account processing circuit 128 is structured to track, maintain, and incorporate transaction descriptions for an account enrolled in the curbside transaction service with the financial institution. The account processing circuit 128 interacts with the curbside management circuit 122 and the curbside completion circuit 142 of the financial institution branch computing system 106, to properly adjust the customer's financial account. In some arrangements, the account processing circuit 128 temporarily debits or credits the customer's financial account when the curbside management circuit 122 completes a request, thereby preventing double spending or early usage of the transaction funds. Upon the financial institution computing system 104 receiving the completed transaction descriptions, the account processing circuit 128 finalizes the adjustment of the customer's financial account. Also, the account processing circuit 128 stores all transaction information in an accounts database 130 within the financial institution computing system 104. For example, the curbside implementation circuit 136, of the financial institution branch computing system 106, provides the account processing circuit 128 with completed transaction descriptions at the completion of a curbside transaction request. In some embodiments, either the financial institution branch computing system 106 or the financial institution computing system 104 keeps track of all the curbside transaction that are submitted and completed by a customer, in order to comply with any regulatory rules. In other embodiments, both the financial institution and the financial institution branch computing system 104, 106 keep track of the transaction history, comprising the details from request submission to completion by the customer.

The financial account database 130 is structured to store account information and transaction records for a plurality of customers of the financial institution. The account database 130 stores details regarding types of accounts held within a financial institution, the type of account holder, whether he or she is authorized for the curbside transactions, information and video of each curbside transaction, and so on for a plurality of customers. A specific account in the accounts database 130 may have a multi-use passcode, for example, a curbside fob or a biometric sample, that is used by the curbside management circuit 122 to transmit the instructions to the financial institution branch computing system 106 to authenticate the customer. In particular, the account database 130 stores each transaction that occurred, and each payment includes the amount of the transaction, the transaction type, the transaction location, and the account source of the transaction.

The financial institution branch computing system 106 includes a network interface circuit 134 and a curbside implementation circuit 136. The network interface 134 is structured to facilitate operative communication between the financial institution branch computing system 106 and other systems and devices via the network 108. The network interface 134 is also structured to facilitate operative communication between the financial institution branch computing system 106 and the financial institution computing system 104 via the network 108. In some arrangements, the financial institution branch computing system 106 is connected to the customer computing system 102 over the network 108, so that the financial institution branch computing system 106 can communicate the finalized request transaction descriptions or any updates or changes to the customer. The financial institution branch computing system 106 may, for example, include one or more servers each with one or more processors configured to execute instructions stored in a memory, send and receive data stored in the memory, and perform other operations to implement the financial services described herein associated with the processing modules, databases, and processes shown.

The curbside implementation circuit 136 is structured to receive the finalized transaction request from the financial institution computing system 104 and generate a plurality of commands to facilitate the completion of the curbside service transaction at the branch location. For example, one command could instruct a branch employee to physically prepare the relevant transaction materials in anticipation of the transaction time. Another command could instruct an employee travel to a nearby branch or institution to pick-up an amount of foreign currency. The curbside implementation circuit 136 includes a curbside detail circuit 138, a customer detection circuit 140, and a curbside completion circuit 142. The curbside implementation circuit 136 is in communication with the request circuit 124 of the financial institution computing system 104. As will be appreciated, the curbside implementation circuit 136 can be in communication with or control a plurality of delivery mechanism (e.g., human worker at the branch, automated dispenser, autonomous device, drone, and the like) at the branch location.

The curbside detail circuit 138 is structured to track, maintain, and incorporate curbside transaction descriptions for an account enrolled in the curbside transaction service with the financial institution. The curbside detail circuit 138 is structured to receive an instruction detail message from the curbside instructions circuit 126 of the financial institution computing system 104. Upon receiving the transaction instructions, the curbside detail circuit 138 ensures that the relevant curbside information is transmitted to the proper entities. For example, the curbside detail circuit 138 can cause a print out of a transaction request instruction on a computer screen of an employee at the branch location. The employee would gather the materials (e.g., currency, foreign currency, deposit slip, etc.) in accordance with the instructions. For example, the employee could place an amount of U.S.D. into an envelope in accordance with the amount and denominations specified in the transaction request and store the envelope until the customer's transaction time window occurs. In some arrangements, the curbside detail circuit 138 is operably connected to a processor that controls a plurality of receptacles near the designated curbside pickup area, wherein the contents of the transaction are delivered through an automated service from inside the branch to the side of the vehicle. In some embodiments, a combination of employee interaction and automated actions is utilized to get the curbside ready for, and ultimately delivered to, the customer.

The customer detection circuit 140 is structured to notify the branch when the customer is approaching or has arrived at the branch location to begin the requested transaction. In some embodiments, the customer "checks in" when arriving at the location, signaling to the branch to approach the car and initiate the transition. This check in can be done through the curbside banking circuit 118 on the customer's mobile computing system 102. In some arrangements, the curbside banking circuit 118 will, with the customer's permission, track the GPS of the customer's mobile computing device, thereby knowing the location of the customer as they approach, and eventually arrive, at the branch location. In some embodiments, the assigned parking spot at the branch location can automatically detect that the customer has arrived. For example, the spot may utilize a proximity sensor, a license plate scanner, geo-fencing or a process that determines that the user's mobile device is within the designated parking spot.

In some arrangements a camera is connected to the customer detection circuit 140 and is used to view the parking spot. This can allow an employee to ascertain an arrival event, the driver's identity and the vehicle information upon a vehicle arriving in the parking spot. In other arrangements, the curbside location has an automated transport mechanism set up. For example, a system similar to the drive-thru options at financial institutions could be utilized, with a system of tubes connecting the financial institution branch to the various receptacles at the curbside pickup locations. Upon arrival, the branch could authenticate the customer and quickly complete the transaction, as any currency would already prepared and ready to deliver to the customer.

The curbside completion circuit 142 is structured to complete the customer authentication for the transaction and generate a transaction confirmation message that includes relevant transaction descriptions. In some embodiments, the customer has to provide additional authentication before gaining access to the items. The additional authentication could be, for example, a one-time passcode or barcode, presentment of ID (e.g., driver's license, passport, etc.), an account or multi-use passcode or password, or a biometric sample that is presented to the employee of the branch. In some arrangements, a branch employee has a photo of the customer and/or the vehicle information of the pickup vehicle to use to authenticate the customer at the curbside pickup location. These identification items may be previously provided by the customer to the financial institution computing system. Upon receiving access to the transaction items the customer can complete the transaction with the branch employee or curbside service receptacle. In some arrangements, the customer has to provide a signature or swipe a card issued by the financial institution to finalize and approve the transaction.

Upon completion of the transaction, the curbside completion circuit 142 generates a transaction confirmation message and transmits it to the financial institution computing system 104. The transaction confirmation message includes relevant transaction descriptions, such as the type of transaction that occurred, the amount of the transaction, the requested time window of the transaction, the actual time the transaction occurred and any additional notes on the transaction. In some embodiments, it also includes a video recording, from the cameras situated near the parking spot, of the transaction occurring. In some arrangements, the picture of the customer could be captured and sent with the confirmation details.

Figure 2:
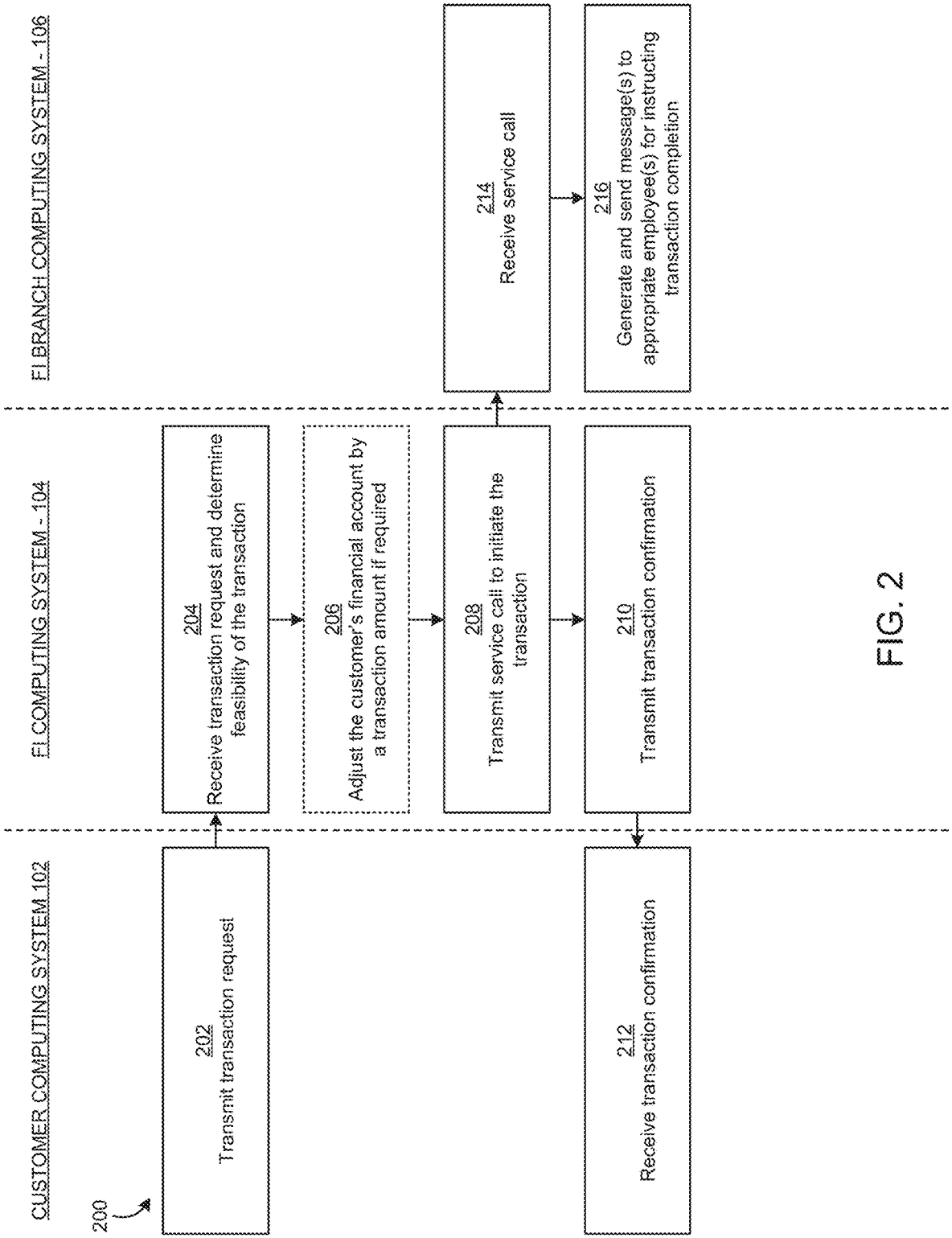
FIG. 2 is a flow diagram of a method of transmitting a curbside transaction request, according to an example embodiment.

Referring to FIG. 2, a flow diagram of a method 200 of transmitting a curbside transaction request is shown, according to an example embodiment. The method 200 is in connection with a customer's (e.g., an account holder at the financial institution) device, a financial institution, and a branch location of the financial institution. For example, the customer may be an individual who operates the customer computing system 102 of FIG. 1. The financial institution may be a financial institution that manages the financial institution computing system 104 of FIG. 1. The branch location may be an entity that manages the financial institution branch computing system 106 of FIG. 1. However, the method 200 may be similarly performed by other systems and devices.

The method 200 begins when a transaction request is transmitted from the customer to the financial institution at 202. The customer computing system 102 transmits the transaction request to the financial institution computing system 104 via the network 108. The transaction request includes various details defining the parameters of a requested curbside transaction from the customer associated with the customer computing system 102. For example, the transaction request includes a transaction type (e.g., withdrawal, deposit, exchange, etc.), a transaction amount, a branch location, a time window, and a financial account to use to facilitate the transaction. The transaction type can be a withdrawal, a deposit, a currency exchange or any other transaction involving the physical passing of items (e.g., coins and bills). For example, the customer could request an exchange, wherein the customer provides 100 U.S.D. at the curbside service in exchange for the equivalent amount in Euros. In some arrangements, multiple transaction types could be requested in a single request. In some embodiments, the branch location and time window can be determined in real-time as the customer enters in the transaction descriptions while creating the request via the customer computing system 102. For example, as the customer enters a currency exchange request, the financial institution computing system 104 can provide real-time feedback to the curbside banking circuit 118 of the customer computing system 102 indicating available branch locations that could complete the transaction on the day of the request. As another example, the financial institution may have no branch available for any transaction for a given day, accordingly the financial institution computing system 104 can provide real-time feedback to the customer computing system 102 that causes the curbside banking circuit 118 to only present available days in the time window field for the customer to schedule the transaction. In other embodiments, the customer submits a desired branch location and time window to the financial institution, and receives an transaction request approval with the details, or a transaction request denial due to unavailability at the branch location at the specified time window.

At 204, the financial institution computing system 104 receives the transaction request from the customer computing system 102 via the network 108. After receiving the request, the financial institution computing system 104 determines the feasibility of the transaction given the transaction parameters included in the transaction request. For example, the financial institution determines whether the requested branch location will be able to complete the withdrawal request between the 3:15 PM and 3:20 PM, whether the customer's account has the necessary funds, and the like.

At 206, the financial institution computing system 104 adjusts the customer's financial account by the transaction amount if the requested transaction requires an account adjustment. The transaction amount includes the requested amount to be withdrawn, deposited or exchanged, and also includes fees associated with the transaction. Fees would be associated with the financial institution and the use of the service. In some embodiments, the account is tentatively adjusted, wherein the movement of the funds is shown in the account, but not yet finalized. For example, if the customer is withdrawing 100 U.S.D. from their account which has 1,000 U.S.D., upon submission of the request, the customer may only be able to use 900 U.S.D. to initiate any subsequent transaction with that account as a source despite not yet completing the withdrawal. Similarly, if the customer is depositing 100 U.S.D. from their account that has 1,000 U.S.D., upon submission of the request, the customer account balance may show 1,100 U.S.D. with only 1,000 U.S.D. available for immediate transactions. However, as noted above, not all requested transaction types require an initial adjustment of the customer's account. For example, if the requested transaction relates to an exchange of bills for coins, no preliminary account balance adjustment is needed.

At 208, the financial institution computing system 104 transmits a service call to the financial institution branch computing system 106 to initiate the transaction via the network 108. The service call is a message transmitted from the financial institution computing system 104 to the financial institution branch computing system 106 that instructs employees of the branch to process and prepare the requested transaction. The service call includes several information fields regarding the transaction descriptions, the authentication details and the location details. In one embodiment, the service call includes instructions to an employee of the branch to ready an amount of a currency to provide to the customer on arrival, for example in a withdrawal request or exchange request. In other embodiments, the service call includes instructions to prepare for a collection of a certain amount of a currency from the customer on the customer's arrival. The authentication details can include any identifying information of the customer to authenticate his or her identity. In some embodiments, the customer has to provide a passcode, for example an account password or a transaction specific passcode generated by the financial institution. In other arrangements, the customer has to provide a biometric sample. In some embodiments, the customer designates a vehicle type and provides a photo of the customer to be used by the employee at the branch location to authenticate the customer.

At 210, the financial institution computing system 104 transmits a transaction confirmation to the customer computing system 102 via the network 108. The transaction confirmation includes details regarding the transaction. For example, the transaction descriptions may include any of a confirmation number associated with the transaction, a reminder as to which branch location the transaction can be completed at, a reminder as to the time window when the transaction can be completed, a reminder as to which parking space the customer is to park at, and the like. In some arrangements, the details include a transaction specific passcode or password for the customer to use to authenticate upon arrival at the branch location. In other arrangements, the details include information on how to change or cancel the submitted transaction request.

At 212, the transaction confirmation is received on the customer computing system 102. Accordingly, the customer can view the transaction confirmation and the associated transaction descriptions the next time he or she logs into his or her account. In some arrangements, the customer computing system 102 presents the transaction confirmation upon receipt as a push notification.

At 214, the financial institution branch computing system 106 receives the service call via the network 108. In some arrangements, the branch location may alter the transaction descriptions, and the financial institution branch computing system 106 can send the changes to the financial institution computing system 104 in response to the altered transaction, which in turn can send the update to the customer computing system 102. For example, if the branch location has an unexpected issue that delays all the services, including the curbside service, the financial institution branch computing system 106 can initiate a message to the customer computing system 102 via the financial institution computing system 104 that informs the customer of the delay and a new pick-up time window. At 216, the financial institution branch computing system 106 generates and sends a message to an appropriate employee (e.g., via an employee computing device) instructing the transaction completion. In some arrangements, the message is an e-mail or in-application message transmitted to a specific employee identifier (e.g., an employee e-mail address). The message instructs the employee to prepare the transaction items. For example, the message may instruct the employee to gather necessary funds (e.g., bills, coins, etc.) or prepare a deposit slip. In some arrangements, the branch location has to retrieve a non-U.S.D. currency from another location (e.g., another branch location or a currency exchange partner) before the arrival of the customer.

Figure 3:
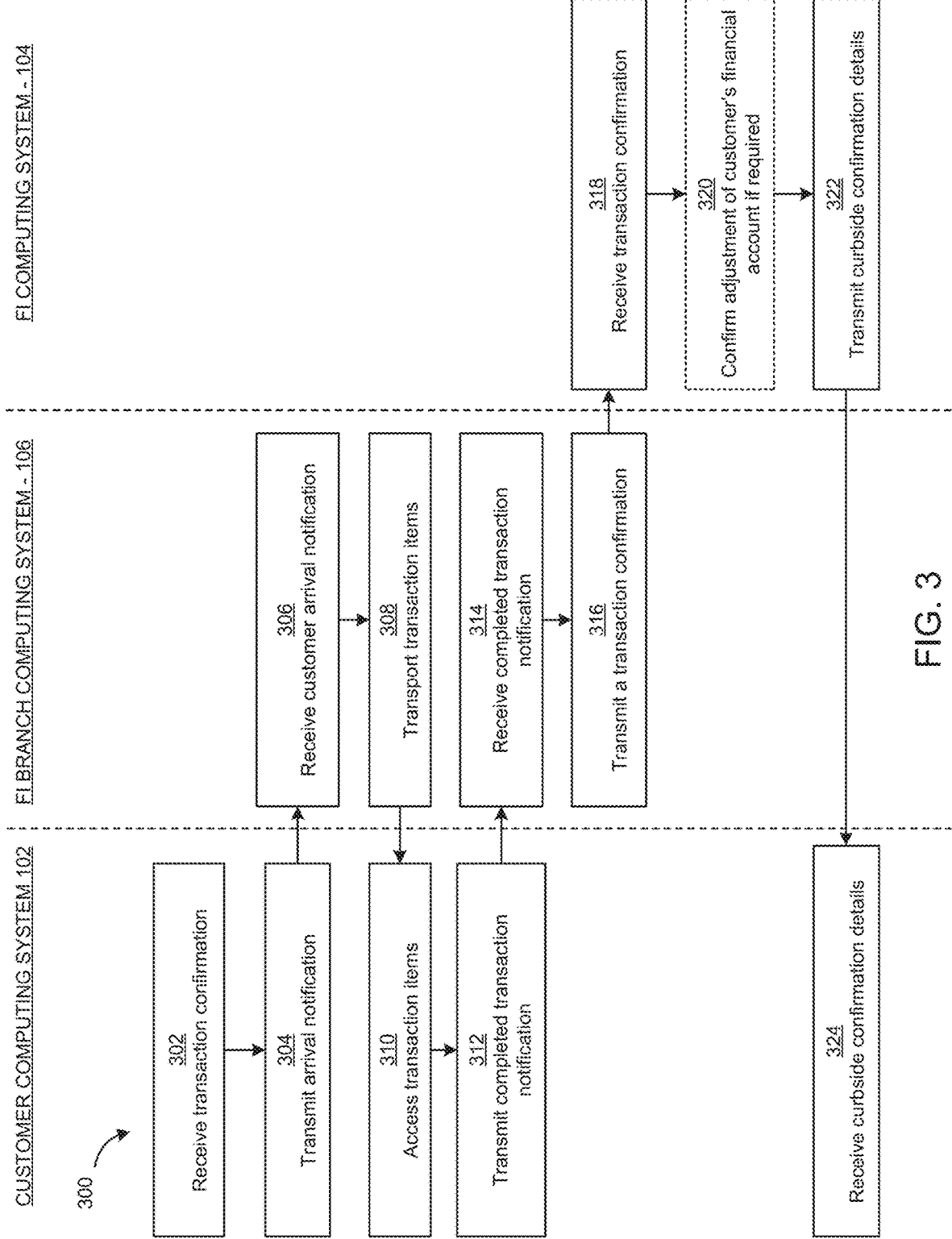
FIG. 3 is a flow diagram of a method of completing a curbside transaction request, according to an example embodiment.

Referring to FIG. 3, a flow diagram of a method 300 of completing a curbside transaction request is shown, according to an example embodiment. The method 300 may be performed in connection with the method 200 of FIG. 2. However, the method 300 may similarly be performed in connection with other types of transactions. The method 300 is shown in connection with a customer's (e.g., an account holder at the financial institution) device, a branch location of the financial institution, and a financial institution. For example, the customer may be an individual who operates the customer computing system 102 of FIG. 1. The branch location may be an entity that manages the financial institution branch computing system 106 of FIG. 1. The financial institution may be a financial institution that manages the financial institution computing system 104 of FIG. 1. However, the method 300 may be similarly performed by other systems and devices. As will be appreciated, the delivery mechanism for completing a curbside transaction request can include a human worker at the branch, an automated dispenser, an autonomous device, a drone, or similar delivery mechanisms.

The method 300 begins when a transaction request confirmation is received by the customer from the financial institution at 302. The financial institution computing system 104 transmits the transaction request confirmation details to the customer computing system 102 via the network 108. The transaction confirmation includes details regarding the transaction. For example, the transaction descriptions may include any of a confirmation number associated with the transaction, a reminder as to which branch location the transaction can be completed at, a reminder as to the time window when the transaction can be completed, a reminder as to which parking space the customer is to park at, and the like. In some arrangements, the details include a transaction specific passcode or password for the customer to use to authenticate upon arrival at the branch location. In other arrangements, the details include information on how to change or cancel the submitted transaction request. For example, the customer receives a branch location street address and a designated parking spot to park in, a password of "password 123" which is needed to complete the withdrawal request, and a time window of 1:15 PM and 1:20 PM.

At 304, an arrival notification is transmitted. The customer arrives at the branch location around the time range specified in the transaction request confirmation details. An arrival notification is transmitted to the financial institution branch computing system 106. In some arrangements, the customer computing system 102 (e.g., mobile device) transmits the arrival notification to the financial institution branch computing system 106 via the network 108. For example, the customer "checks in" on his or her mobile device when they arrive at the location, signaling to the branch to approach the customer's car and initiate the transition. The check in may be done through an application with the financial institution on the customer's mobile computing device 102. In some arrangements, the financial institution's application will, with customer permission, track the GPS of the customer's mobile computing device, thereby knowing the location of the customer as they approach, and eventually arrive, at the branch location. In further arrangements, the financial institution branch computing system 106 automatically detects the arrival of the customer (e.g., via a license plate scanner, via geofencing, via a received biometric of the customer, etc.).

Upon arrival by the customer, at 306, the financial institution branch computing system 106 receives the customer arrival notification. In some embodiments, the arrival notification is generated within the financial institution branch computing system 106. For example, the designated parking spot at the branch location can automatically detect that a vehicle arrived in the spot. In some arrangements, the parking spot utilizes a proximity sensor, a license plate scanner, geo-fencing or by pinging that the customer's mobile device when the device is within a range of the designated parking spot. In other arrangements, a camera could be positioned to view the parking spot and an employee initiates the arrival notification when the employee views the customer designated vehicle type and provided photo of the customer.

At 308, the financial institution branch computing system 106 facilitates the transport of the transaction items to the vehicle in the parking lot. The financial institution branch computing system 106 generates and sends a message to an appropriate employee (e.g., via an employee computing device) instructing the employee to transport the transaction items to a parking spot. For example, an employee receives a notification on a computing device informing them to take the U.S.D. currency in curbside preparation slot one to parking spot A within in the next five minutes.

At 310, the customer computing system 102 accesses the transaction items transported to the customer vehicle. The customer computing system 102 may receive a notification from the financial institution branch computing system 106 indicating that a branch employee is bringing the transaction items to the customer's vehicle. In some embodiments, the customer has to provide additional authentication to the branch employee before gaining access to the items. The additional authentication could be, for example, a one-time passcode or barcode, presentment of ID, an account or multi-use passcode or password, or a biometric sample to the employee. At 312, the customer computing system 102 transmits a completed transaction notification to the financial institution branch computing system 106. For example, the customer confirms that the transaction items were received on the customer's mobile device. In some arrangements, the customer has to provide a signature to the employee or swipe a card issued by the financial institution on an branch employee computing system to finalize and approve the transaction.

At 314, the financial institution branch computing system 106 receives the completed transaction notification via the network 108. In some arrangements, the completed transaction notification is transmitted from the customer computing system 102. In other arrangements, the completed transaction notification is transmitting from a computing device of the branch employee. For example, the employee has the customer sign on an employee computing device once the transaction is finished. The completed transaction notification includes several information fields regarding the transaction completion. In one embodiment, the completed transaction notification includes the name of the branch employee who facilitated the transaction with the customer. In other embodiments, the completed transaction notification includes the arrival time of the customer and the time that the completion was finalized. In some embodiments, the completed transaction notification includes information regarding issues or problems that arose during the transaction. For example, the transaction items were improperly prepared and there was a deficiency in the U.S.D. transported to the customer.

At 316, the financial institution branch computing system 106 transmits a transaction confirmation to the financial institution computing system 104 via the network 108. The transaction confirmation includes several information fields regarding the transaction as requested and eventually completed. In one embodiment, the transaction confirmation includes the type of transaction that was requested, the amount of the transaction, the time window of the transaction, the actual time the transaction occurred and the amount of currency provided to the customer. In some embodiments, the transaction confirmation includes a video, from the cameras situated near the parking spot, of the transaction occurring. In some arrangements, the transaction confirmation includes the details provided in the completed transaction notification.

At 318, the financial institution computing system 104 receives the transaction confirmation from the financial institution branch computing system 106 via the network 108. The financial institution computing system 104 determines whether or not the transaction was completed correctly, in accordance with the request. If the transaction completed details show a shortcoming by the branch, the financial institution may try to rectify those issues moving forward in order to improve the customer experience with the service.

At 320, the financial institution computing system 104 finalizes the adjustment of the customer's financial account by the transaction amount. In some embodiments, the account has been previously tentatively adjusted, wherein the movement of the funds is shown in the account, but not yet finalized, for example, at 208 of the method 200 of FIG. 2. In other embodiments, the account is only adjusted by the transaction amount upon completion of the transaction. The transaction amount includes the actual amount that was withdrawn, deposited or exchanged, and also includes fees associated with the transaction. Fees would be associated with the financial institution and the use of the service. Not all requested transaction types require a finalized adjustment of the customer's account. For example, if the requested transaction relates to an exchange of bills for coins, no account balance adjustment is needed.

At 322, the financial institution computing system 104 transmits a curbside confirmation message to the customer computing system 102 via the network 108. The curbside confirmation message includes details regarding the requested and completed curbside transaction. For example, the curbside confirmation details may include any of a confirmation number associated with the transaction, a summary of the requested transaction, a summary of the transaction as completed, an account update reflected the transaction, and the like. At 324, the curbside confirmation is received on the customer computing system 102. Accordingly, the customer can view the curbside confirmation and the associated transaction descriptions the next time he or she logs into his or her account. In some arrangements, the customer computing system 102 presents the curbside confirmation upon receipt as a push notification.

FIGS. 4A-4D illustrate an example graphical user interface ("GUI") 400 that may be utilized to submit a curbside transaction request, according to an example embodiment. For example, the GUI 400 is displayed to the customer via the customer computing system 102 of FIG. 1. The GUI 400 may be utilized in connection with the method 200 of FIG. 2 and the method 300 of FIG. 3, according to example embodiments. For example, the customer utilizes the GUI 400 to submit a curbside transaction request, via method 200. As another example, the customer utilizes the GUI 400 to receive a curbside transaction request confirmation from the financial institution and complete the curbside transaction, via method 300. However, it should be understood that the GUI 400 may similarly be utilized on other devices to conduct curbside transactions.

Figure 4A:
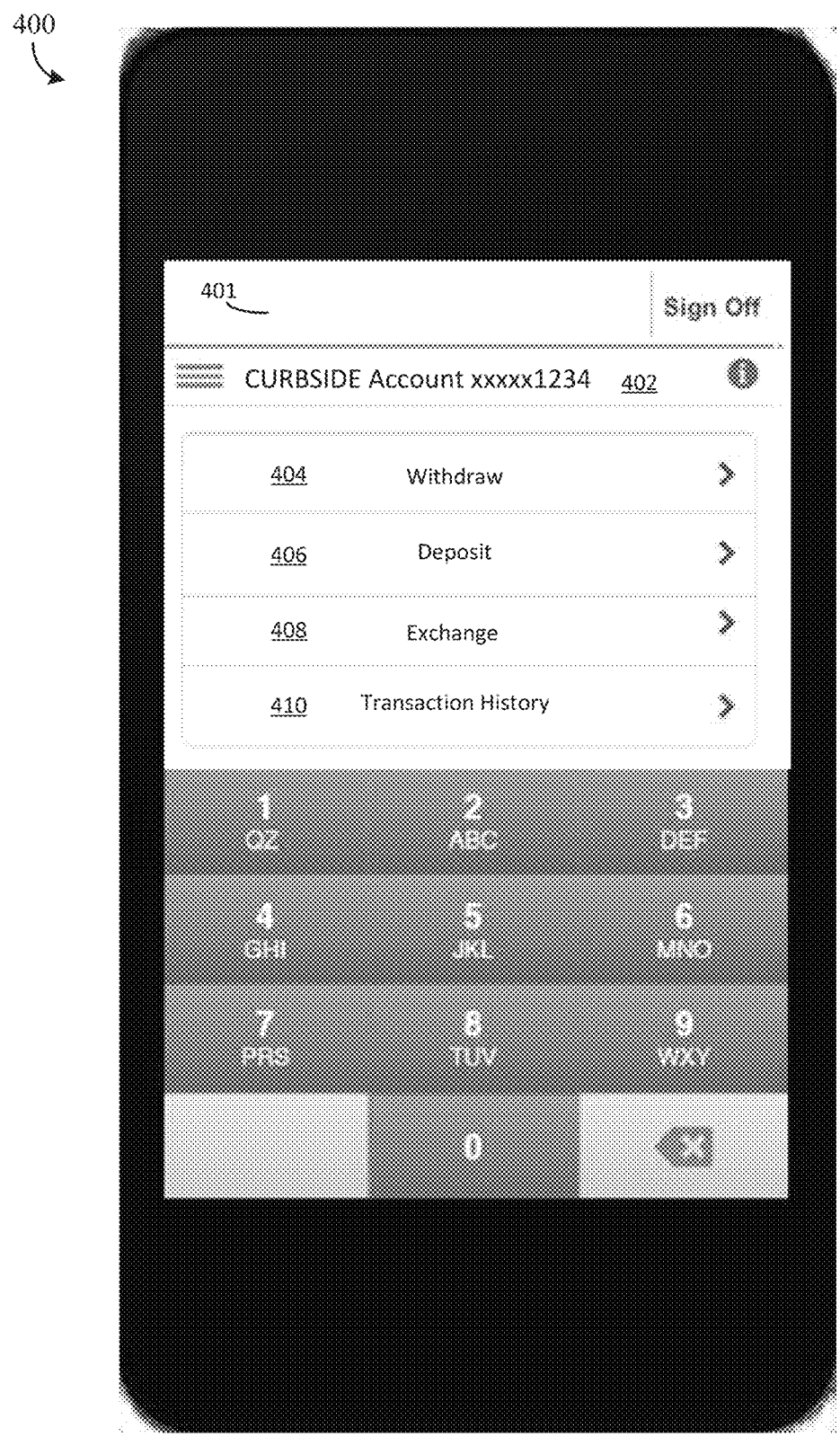
FIGS. 4A-4D illustrate display screens that may be displayed the user during the methods of FIG. 2 and FIG. 3.

FIG. 4A illustrates a menu page 401 of the GUI 400, according to an embodiment. The GUI 400 includes a mobile banking interface that is displayed to the customer after accessing the curbside banking circuit 118 that has been installed on the customer computer system 102. In another embodiment, the GUI 400 may similarly be accessed via an online banking website. Upon accessing the GUI 400, the customer is prompted to provide login credentials to gain access to the account with the financial institution. By providing such credentials, the customer is provided with the full functionality of the online banking system in the curbside banking circuit. In an example embodiment, the menu page 401 includes a plurality of menu option for the customer's specific financial account 402. In this example, the customer is authorized to execute curbside services from the customer's financial account. The menu page 401 includes several menu buttons labeled with a corresponding action. For example, the menu buttons include a withdraw button 404, a deposit button 406, an exchange button 408, and a transaction history 410 button.

Figure 4B:
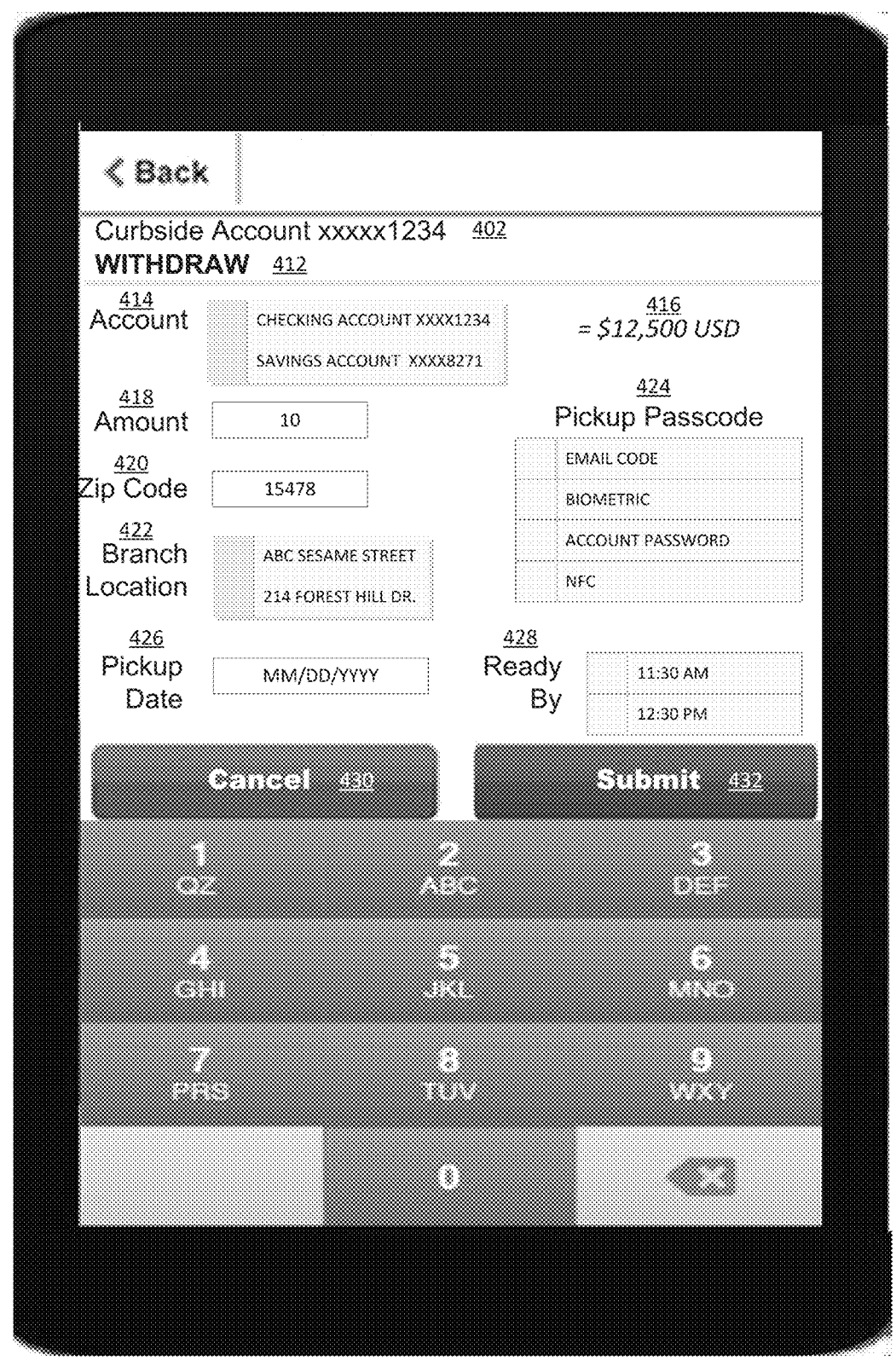

Referring now to FIG. 4B, a curbside service withdraw funds page 412 of the GUI 400 of FIG. 4A is illustrated. For example, the curbside service withdraw funds page 412 is displayed in response to a customer selection of the withdraw button 404 on the menu bar provided in FIG. 4A. The curbside service withdraw funds page 412 provides the customer a plurality of fields to easily facilitate receiving cash, curbside at a branch location. According to an embodiment, the curbside service withdraw funds page 412 includes a source account field 414, a source account balance field 416, an amount field 418, a zip code field 420, a branch location field 422, a pickup passcode field 424, a pickup date field 426, and a pickup time field 428. The source account field 414 defines which account the customer would like to use to complete the transaction. This could be, for example, the checking account for which the customer would like the withdrawn funds to be taken from. In some arrangements, the source account field 414 is defaulted to the account that was originally selected to begin the curbside service transaction service, for example the specific financial account 402 as shown in FIG. 4A. The customer may change the source account fund to another financial account with the financial institution, that causes the specific financial account 402 to update to the newly selected option.

The source account balance field 416 displays the amount of available funds in the selected account in the source account field 414. The source account balance field 416 will update, in real-time, the balance depending on the account selected by the customer. The amount field 418 displays how much the customer would like to use in the selected curbside transaction. For example, the customer selects to withdraw from the selected account 10 U.S.D. In some arrangements, the amount field 418 will only allow the customer to enter an amount less than or equal to the source account balance field 416. In some arrangements, when the customer selects the withdraw option and enters the amount of currency to be withdrawn, the customer may get an additional field that allows the customer to enter the denominations of each value of currency he or she would like. For example, if the customer requests to withdraw 30 U.S.D. from the checking account, an additional field may allow the customer to designate that he or she receives one ten dollar bill and one twenty dollar bill.

The zip code field 420 allows the customer to enter the zip code for the area in which he or she would like to find a financial institution branch location to complete the transaction. In some arrangements, the customer is able to enter a full address in the zip code field 420 to provide for more accurate location matching by the financial institution. The branch location field 422 is a drop down menu of all the branch locations within the customer entered zip code. In some arrangements, the branch location field 422 is updated in real-time, in response to the value entered in the zip code field 422. In other arrangements, the branch location field 422 updates in response to the customer entering in a desired pickup date and pickup time in their fields, respectively 426 and 428.

The pickup passcode field 424 allows the customer to choose which form of authentication is to be used by the branch location on the subsequent curbside transaction by the customer. As shown in FIG. 4B, the customer may require that the financial institution email a one-time passcode to the customer's email address, that the customer provide a biometric sample, that the customer provide a multi-use account password, or that the customer be able to utilize near field communication to authenticate. In other arrangements, the customer has a curbside service transaction profile with possible vehicle identification information and/or a customer photograph.

The pickup date field 426 allows the customer to enter the date that the customer would like to complete the curbside transaction. In some arrangements, the branch location field 422 updates, in real-time, in response to the pickup date options displayed in the field 426. In some embodiments, the pickup date field 426 is a drop down option menu, the options responsive to the transaction type and selected branch location. In other arrangements, the customer enters in a the date, in some format, for example MM/DD/YYYY.

The pickup time field 428 allows the customer to select the time window for which they would like to complete the curbside transaction. In some arrangements, the pickup time field is a drop down selection responsive to the transaction type, transaction location and transaction date entries. The drop down selection could specify a single time entry for which the transaction is requested to be ready by, as shown in FIG. 4B, or may be a selection of a range of time, for example from 11:30 AM to 11:45 AM. In other arrangements, the pickup time field 428 is an empty field that the customer enters any valid time into. In some arrangements, the customer entering a pickup time and pickup date combination first, changes the available branch locations, as some locations may be unable to handle the transaction type and the requested date and time. The customer chooses to approve the transaction displayed by selecting the "Submit" button 432, or the customer may cancel the transaction request via the "Cancel" button 430 In some embodiments, either selection leads to an additional confirmation prompt by the application.

Figure 4C:
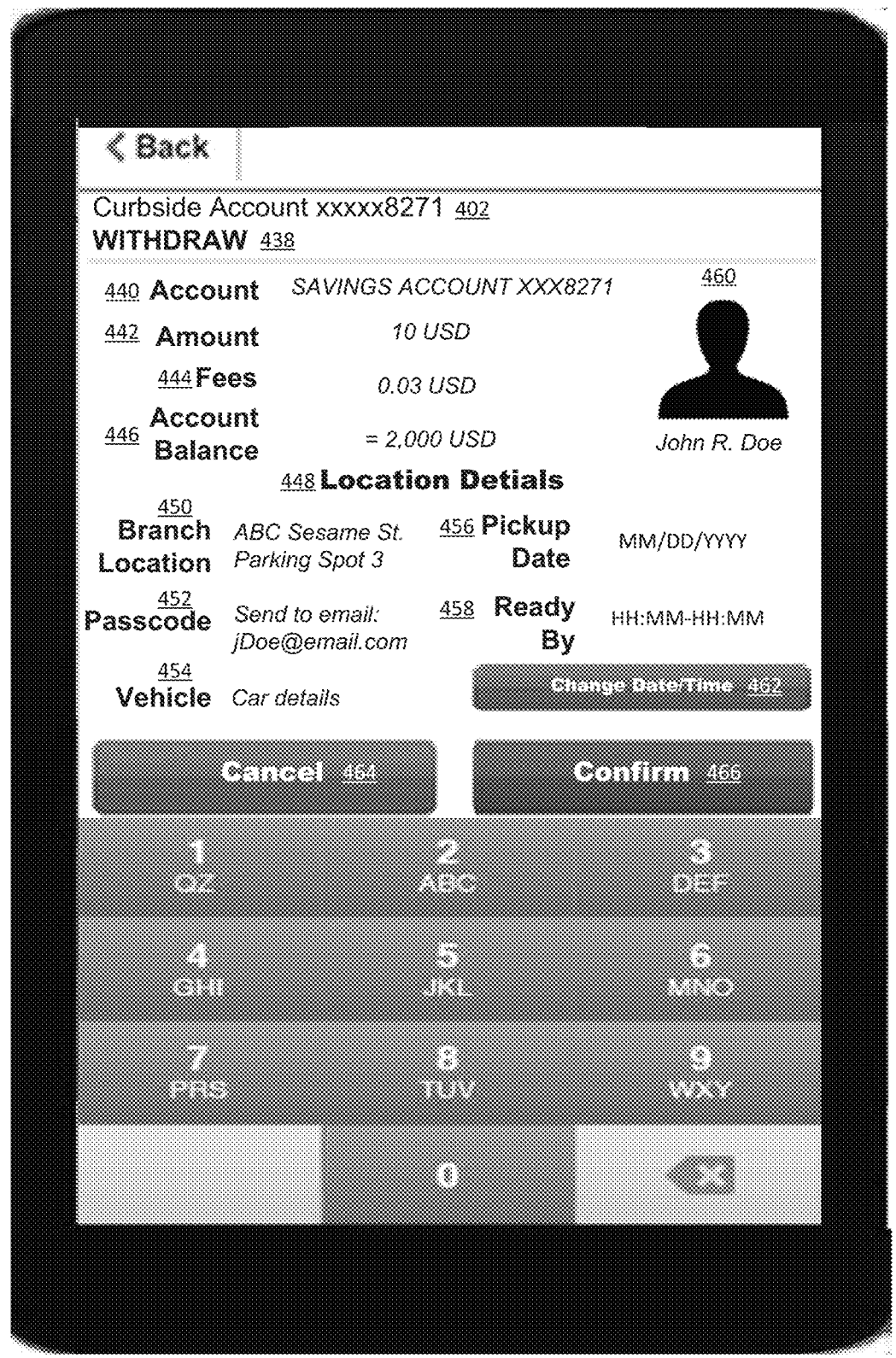

Referring now to FIG. 4C, a curbside service withdraw funds request summary page 438 of the GUI 400 of FIG. 4A is illustrated. For example, withdraw funds request summary page 438 is displayed in response to a customer selection of the "Submit" button 432 on the button bar provided in FIG. 4B. The withdraw funds request summary page 438 provides the customer a plurality of fields that summarize the details regarding the request submission, and reflects availability changes. According to an embodiment, the withdraw funds request summary page 438 includes a source account field 440, a transaction amount field 442, a fees field 444, a source account balance field 446, and a location details field 448.

The source account field 440, the transaction amount field 442 and the source account balance field 446 display the information entered into the withdraw funds page 412 as shown in FIG. 4B. The fees field 444 of the GUI 400 displays fees associated with the transaction. The total transaction amount includes the requested amount to be transmitted to the recipient, and any fees associated with the transaction.

The location details field 448 includes the relevant information for the customer to arrive at the proper branch location and complete the transaction. The location details field includes a plurality of fields that summarize the location details and include a branch location field 450, a passcode field 452, a pickup vehicle field 454, a pickup date field 456, a pickup time field 458 and a customer photo 460. The branch location field 450 is the customer selected option from the drop down menu of all the branch locations within the customer entered zip code. The passcode field 452 displays the customer's selection for the form of authentication to be used by the branch location on the curbside transaction. For example, the customer may have requested that the financial institution email a one-time password to the customer's email address, such as "jDoe@email.com" as shown in FIG. 4C.

The pickup vehicle field 454 displays the customer's information regarding the information of the vehicle that will be used to complete the curbside transaction. In some arrangements, the vehicle information may include the vehicle model, vehicle manufacturer, vehicle year, vehicle color, and license plate number of the vehicle. In some arrangements, a customer has multiple vehicles on a curbside profile tied to the financial institution account. In other arrangements, a picture of the vehicle is uploaded onto the customer's curbside profile.

The pickup data field 456 displays the customer's choice of the date that the customer would like to complete the curbside transaction. In some arrangements, the date is a result of the financial institution choosing the best date based on a multiple date options selected by the customer in a previous menu. The pickup time field 458 displays the time window for which the customer would like to complete the curbside transaction. The customer photo 460 can be a photo of the customer that will be completing the transaction and the photo can be transmitted to an employee of the branch and used to provide additional authentication to complete the transaction.

The withdraw funds request summary page 438 of the GUI 400 also includes a "change date and/or time" button 462 that allows the customer to alter the location and timing details of the curbside transaction. The customer chooses to approve the transaction displayed by selecting the "Confirm" button 466, or the customer may cancel the transaction request via the "Cancel" button 464. In some embodiments, either selection leads to an additional confirmation prompt by the application.

Figure 4D:
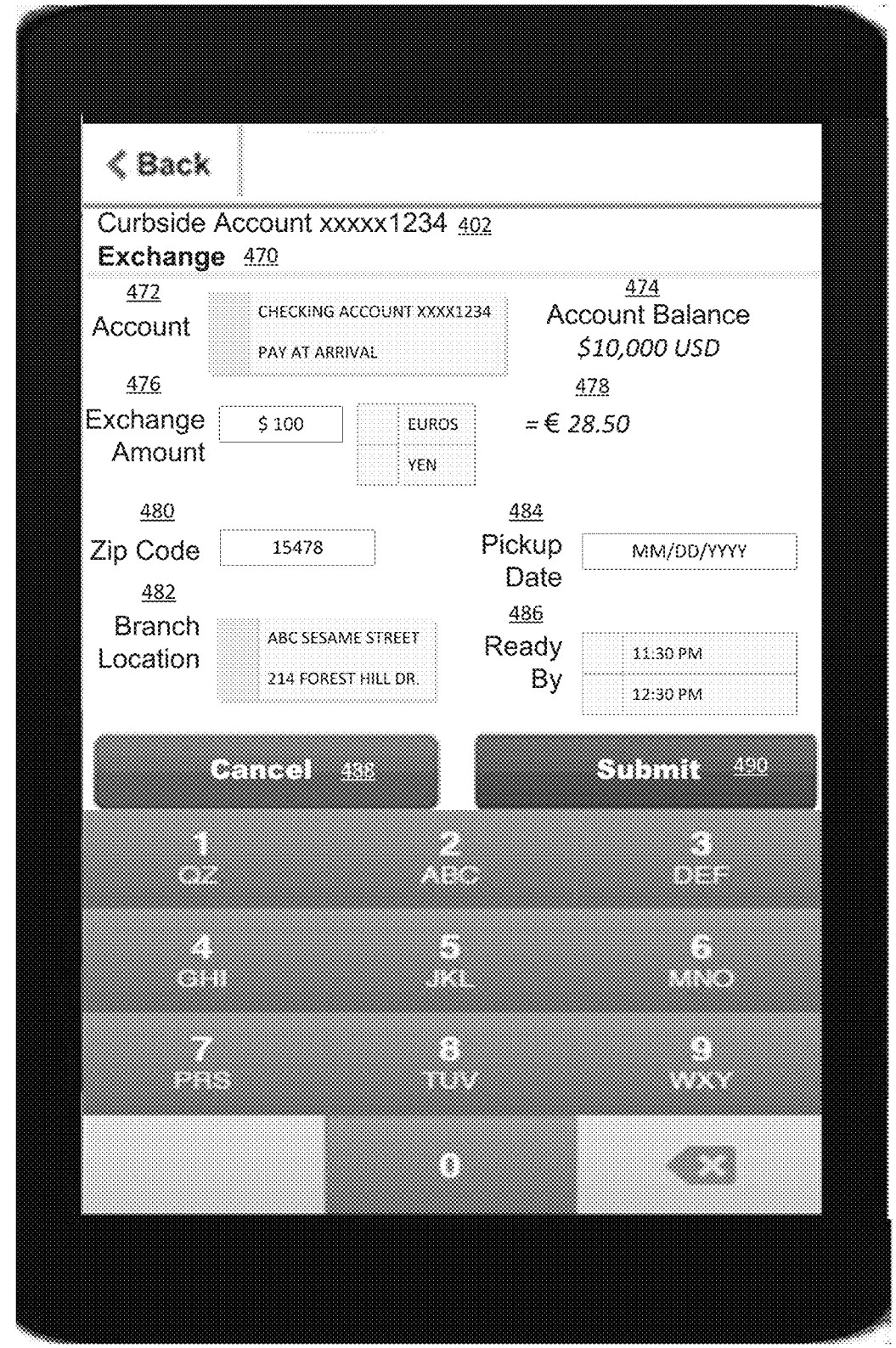

Referring now to FIG. 4D, a curbside service exchange funds page 470 of the GUI 400 of FIG. 4A is illustrated. For example, the curbside service exchange funds page 470 is displayed in response to a customer selection of the exchange button 408 on the menu bar provided in FIG. 4A. The curbside service exchange funds page 470 provides the customer a plurality of fields to easily facilitate receiving cash, curbside at a branch location. According to an embodiment, the curbside service exchange funds page 470 includes a source account field 472, a source account balance field 474, an exchange amount field 476, an equivalent amount field 478, a zip code field 480, a branch location field 482, a pickup date field 484, and a pickup time field 486. In some arrangements, the GUI 400 displays a pickup passcode field that allows the customer to choose which form of authentication to be used by the branch location on the subsequent curbside transaction by the customer.

The source account field 472 defines which account the customer would like to use to complete the transaction. This could be, for example, the checking account for which the customer would like the withdrawn funds to be taken from. In some arrangements, the source account field 472 is defaulted to the account that was originally selected to begin the curbside service transactions, for example the specific financial account 402 as shown in FIG. 4A. The customer may change the source account fund to another financial account with the financial institution, that causes the specific financial account 402 to update to the newly selected option. In some arrangements, the customer selects to pay for the exchange upon arrival at the branch location. For example, the customer could provide 100 U.S.D. in cash at the curbside location to the employee in exchange for the equivalent amount.

The source account balance field 474 displays the amount of available funds in the selected account in the source account field 472. The source account balance field 474 will update, in real-time, the balance depending on the account selected by the customer. The amount field 474 displays how much the customer would like to use in the exchange currency curbside transaction. For example, the customer selects to withdraw from the selected account 100 U.S.D. In some arrangements, the amount field 476 only allows for the customer to enter an amount less than or equal to the source account balance field 474. In some arrangements, when the customer selects the exchange option and enters the amount of currency to be exchanged, the customer gets an additional field that allows the customer to enter the denominations of each value of currency he or she would like to end up with at the completion of the exchange. For example, if the customer requests to withdraw 30 U.S.D. from the checking account for the equivalent amount of a foreign currency, for example Euros, an additional field allows for the customer to designate that he or she receives fourteen €2 coins. In some arrangements, the customer selects to receive an amount of the foreign currency. For example, the customer could request 100 Euros and the equivalent amount field 478 would display the equivalent amount of U.S.D. that would be required to complete the transaction.

The equivalent amount field 478 of the GUI 400 displays an amount in the customer's primary fiat currency (e.g., U.S.D.) that is equivalent to the amount of foreign currency requested in the exchange amount field 476. For example, as shown in FIG. 4D, if the U.S.D. amount in the amount field 476 is 100 U.S.D., the equivalent amount field 478 of the GUI 400 displays the amount of euro currency equivalent to the requested amount of U.S.D. In some arrangements where the customer selects to receive an amount of the foreign currency, the equivalent amount field 478 displays how much U.S.D. currency is required to complete the exchange. For example, the customer could request 100 Euros and the equivalent amount field 478 would display the equivalent amount of U.S.D. that would be required to complete the transaction, 120 U.S.D.

The zip code field 480 allows the customer to enter the zip code for the area in which he or she would like to find a financial institution branch location to complete the transaction. In some arrangements, the customer is able to enter a full address in the zip code field 480 to provide for more accurate location matching by the financial institution. The branch location field 482 is a drop down menu of all the branch locations within the customer entered zip code. In some arrangements, the branch location field 482 is updated in real-time, in response to the value entered in the zip code field 480. In some arrangements, the branch location field 482 may be limited due to branch locations lacking the currency type that the customer wants to exchange the U.S.D. for. In other arrangements, the branch location field 482 updates in response to the customer entering in a desired pickup date and pickup time in their fields, respectively 484 and 486.

The pickup date field 484 allows the customer to enter the date that the customer would like to complete the curbside transaction. In some arrangements, the branch location field 484 updates, in real-time, the pickup date options displayed in the field 484. In some embodiments, the pickup date field 484 is a drop down option menu, the options responsive to the transaction type and selected branch location. In other arrangements, the customer enters in a date, in some format, for example MM/DD/YYYY.

The pickup time field 486 allows the customer to select the time window for which they would like to complete the curbside transaction. In some arrangements, the pickup time field 486 is a drop down selection responsive to the transaction type, transaction location and transaction date entries. The drop down selection could specify a single time entry for which the transaction is requested to be ready by, as shown in FIG. 4D, or a selection of a range of time, for example from 11:30 AM to 11:45 AM. In other arrangements, the pickup time field 486 is an empty field that the customer enters any valid time into. In some arrangements, the customer entering a pickup time and pickup date combination first, may change the available branch locations, as some locations may be unable to handle the transaction type and the requested date and time. The customer chooses to approve the transaction displayed by selecting the "Submit" button 490, or the customer may cancel the transaction request via the "Cancel" button 488. In some embodiments, either selection leads to an additional confirmation prompt by the application.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server).

To that end, a "circuit" as described herein may include components that are distributed across one or more locations.

An example system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed:

1. A method for completing a curbside transaction, the method comprising:

receiving, by a financial institution computing system of a financial institution, a curbside transaction description from a user device, the user device associated with an account holder of the financial institution, and the curbside transaction description comprising at least one of a transaction time, a branch location, and a transaction to be completed at the branch location, the branch location associated with a branch of the financial institution;

transmitting, by the financial institution computing system, a curbside set-up request to a branch location computing system associated with the branch location, the curbside set-up request comprising the curbside transaction description;

transmitting, by the financial institution computing system, curbside transaction information to the user device, the curbside transaction information comprising a location request, the location request associated with the user device providing location information of the user device;

receiving, by the financial institution computing system, location information from the user device indicative of the user device being located at the branch location;

receiving, by the financial institution computing system, an authentication identifier from the user device, the authentication identifier previously stored on the user device, wherein receiving the authentication identifier initiates the curbside transaction; and servicing the account holder via a receptacle of a plurality of receptacles, the receptacle chosen based on the location information and the curbside transaction description.

2. The method of claim 1, wherein the curbside transaction description is a funds withdrawal and the curbside transaction description further comprises an amount of a currency type, further comprising transmitting, by the financial institution computing system, a funds withdrawal message to the branch location computing system, the funds withdrawal message comprising instructions to an employee at the branch location to prepare the amount of the currency type.

3. The method of claim 1, wherein the curbside transaction description is a funds withdrawal and the curbside transaction description further comprises an amount of a currency type, further comprising dispensing, to the account holder associated with the user device, the amount of the currency type.

4. The method of claim 1, wherein the curbside transaction description is a funds deposit, further comprising:

transmitting, by the financial institution computing system, a funds deposit message to the branch location computing system, the funds deposit message comprising instructions to an employee at the branch location to prepare a receptacle to receive currency.

5. The method of claim 1, further comprising, transmitting, by the financial institution computing system, a ready transaction notification to the user device, the ready transaction notification indicating that a pending transaction associated with the curbside transaction information is ready to be completed by the account holder at the branch location.

6. The method of claim 1, wherein the authentication identifier relates to at least one of a password string, fob, a scan of a biometric sample of the account holder, or a request to present identification.

7. The method of claim 1, wherein the authentication identifier is transmitted via near-field communication (NFC) from the user device to a reader device associated with the financial institution computing system.

8. A non-transitory computer readable media having computer-executable instructions embodied therein that, when executed by a computing system associated with a financial institution causes the financial institution computing system to perform operations for completing a curbside transaction, the operations comprising:
   receiving a curbside transaction description from a user device, the user device associated with an account holder of the financial institution, and the curbside transaction description comprising at least one of a transaction time, a branch location, and a transaction to be completed at the branch location, the branch location associated with a branch of the financial institution;
   transmitting a curbside set-up request to a branch location computing system associated with the branch location, the curbside set-up request comprising the curbside transaction description;
   transmitting curbside transaction information to the user device, the curbside transaction information comprising a location request, the location request associated with the user device providing location information of the user device;
   receiving location information from the user device indicative of the user device being located at the branch location;
   receiving an authentication identifier from the user device, the authentication identifier previously stored on the user device, wherein receiving the authentication identifier initiates the curbside transaction; and
   servicing the account holder via a receptacle of a plurality of receptacles, the receptacle chosen based on the location information and the curbside transaction description.

9. The computer readable media of claim 8, wherein the curbside transaction description is a funds withdrawal and the curbside transaction description further comprises an amount of a currency type, further comprising, transmitting a funds withdrawal message to the branch location computing system, the funds withdrawal message comprising instructions to an employee at the branch location to prepare the amount of the currency type.

10. The computer readable media of claim 8, wherein the curbside transaction description is a funds withdrawal and the curbside transaction description further comprises an amount of a currency type, further comprising, dispensing, to the account holder associated with the user device, the amount of the currency type.

11. The computer readable media of claim 8, wherein the curbside transaction description is a funds deposit, the operations further comprising:
   transmitting a funds deposit message to the branch location computing system, the funds deposit message comprising instructions to an employee at the branch location to prepare a receptacle to receive currency.

12. The computer readable media of claim 8, wherein the authentication identifier relates to at least one of a password string, fob, a scan of a biometric sample of the account holder, or a request to present identification.

13. The computer readable media of claim 8, wherein the authentication identifier is transmitted via near-field communication (NFC) from the user device to a reader device associated with the financial institution computing system.

14. A financial institution computing system associated with a financial institution, the computing system comprising:
   a network interface configured to communicate data regarding a curbside transaction to and from a branch location computing system associated with a branch of the financial institution and a user device associated with a user over a network; and
   a circuit configured to:
      receive a curbside transaction description from the user device, the user device associated with an account holder of the financial institution, and the curbside transaction description comprising at least one of a transaction time, a branch location, and a transaction to be completed at the branch location, the branch location associated with the branch of the financial institution;
      transmit a curbside set-up request to the branch location computing system associated with the branch location, the curbside set-up request comprising the curbside transaction description;
      transmit curbside transaction information to the user device, the curbside transaction information comprising a location request, the location request associated with the user device providing location information of the user device;
      receive location information from the user device indicative of the user device being located at the branch location;
      receive an authentication identifier from the user device, the authentication identifier previously stored on the user device, wherein receiving the authentication identifier initiates the curbside transaction; and
      service the account holder via a receptacle chosen based on the location information and the curbside transaction description.

15. The financial institution computing system of claim 14, wherein the curbside transaction description is a funds withdrawal and the curbside transaction description further comprises an amount of a currency type, and wherein the circuit is further structured to transmit a funds withdrawal message to the branch location, the funds withdrawal message comprising instructions to an employee at the branch to prepare the amount of the currency type.

16. The financial institution computing system of claim 14, wherein the curbside transaction description is a withdrawal and the curbside transaction description further comprises an amount of a currency type, further comprising, dispensing, to the account holder associated with the user device, the amount of the currency type.

17. The financial institution computing system of claim 14, wherein the curbside transaction description is a currency exchange, and wherein the curbside transaction description comprises a first amount of a first currency type and a second amount of a second currency type, the second amount of the second currency type being what the account holder must provide to acquire the first amount of the first currency type.

18. The financial institution computing system of claim 14, wherein the circuit is further structured to transmit a ready transaction notification to the user device, the ready transaction notification indicating that a pending transaction associated with the curbside transaction information is ready to be completed by the account holder at the branch location.

19. The financial institution computing system of claim 14, wherein the authentication identifier comprises a pass code authentication, the pass code authentication being at least one of a password string, fob, biometric scan, or a request to present identification.

20. The financial institution computing system of claim 14, wherein the authentication identifier is transmitted via near-field communication (NFC) from the user device associated with the financial institution computing system.

* * * * *